US012777238B2

(12) United States Patent
Xue et al.
(10) Patent No.: US 12,777,238 B2
(45) Date of Patent: Oct. 27, 2026

(54) MAGNETIC LOCK MECHANISM CAMERA AND GIMBAL

(71) Applicant: SZ DJI TECHNOLOGY CO., LTD., Shenzhen (CN)

(72) Inventors: Guanghuai Xue, Shenzhen (CN); Wei Huang, Shenzhen (CN); He Tian, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 137 days.

(21) Appl. No.: 18/803,111

(22) Filed: Aug. 13, 2024

(65) Prior Publication Data

US 2024/0406529 A1 Dec. 5, 2024

Related U.S. Application Data

(63) Continuation of application No. PCT/CN2022/080223, filed on Mar. 10, 2022.

(51) Int. Cl.
*H04N 23/54* (2023.01)
*E05B 47/00* (2006.01)
(Continued)

(52) U.S. Cl.
CPC ......... *H04N 23/54* (2023.01); *E05B 47/0004* (2013.01); *E05B 47/026* (2013.01);
(Continued)

(58) Field of Classification Search
None
See application file for complete search history.

(56) References Cited

U.S. PATENT DOCUMENTS

2004/0017485 A1* 1/2004 Ohishi ...................... G03B 5/00 348/208.99
2004/0085639 A1* 5/2004 Katagishi ............... G02B 7/022 359/557

(Continued)

FOREIGN PATENT DOCUMENTS

CN 2185775 Y 12/1994
CN 102681132 A 9/2012

(Continued)

OTHER PUBLICATIONS

The World Intellectual Property Organization (WIPO) International Search Report for PCT/CN2022/080223 Nov. 30, 2022 7 Pages (including translation).

*Primary Examiner* — Paul M Berardesca
(74) *Attorney, Agent, or Firm* — ANOVA LAW GROUP, PLLC

(57) ABSTRACT

A camera includes a sensor assembly and a lock mechanism. The sensor assembly includes a movable member and an image sensor coupled to the movable member and configured to move together with the movable member. The lock mechanism is configured to lock the movable member to limit movement of the movable member. The lock mechanism includes a coil assembly and a magnetic attraction assembly. The coil assembly or the magnetic attraction assembly is configured to move closer to or away from the movable member under an action of a magnetic field force in response to the coil assembly being energized, to lock or unlock the movable member.

18 Claims, 10 Drawing Sheets

(51) Int. Cl.
*E05B 47/02* (2006.01)
*H04N 23/667* (2023.01)
*H04N 23/68* (2023.01)

(52) U.S. Cl.
CPC ......... *H04N 23/667* (2023.01); *H04N 23/687* (2023.01); *E05B 2047/0007* (2013.01)

(56) References Cited

U.S. PATENT DOCUMENTS

| | | | | |
|---|---|---|---|---|
| 2007/0093108 | A1 * | 4/2007 | Nemoto | H04N 23/687<br>439/191 |
| 2007/0222544 | A1 * | 9/2007 | Seo | H04N 23/68<br>335/285 |
| 2012/0169070 | A1 * | 7/2012 | Huang | E05B 47/0047<br>292/142 |
| 2016/0270874 | A1 | 9/2016 | Sporer et al. | |
| 2021/0002922 | A1 * | 1/2021 | Xiang | E05B 47/0657 |
| 2022/0279126 | A1 * | 9/2022 | Katsumata | H04N 23/667 |

FOREIGN PATENT DOCUMENTS

| | | | | | |
|---|---|---|---|---|---|
| CN | 106836995 | A | * | 6/2017 | E05B 47/02 |
| CN | 110418034 | A | | 11/2019 | |
| CN | 111684194 | A | | 9/2020 | |
| CN | 212960679 | U | | 4/2021 | |
| JP | H0934001 | A | | 2/1997 | |

* cited by examiner

MAGNETIC LOCK MECHANISM CAMERA AND GIMBAL

CROSS-REFERENCE TO RELATED APPLICATION

This application is a continuation of International Application No. PCT/CN2022/080223, filed on Mar. 10, 2022, the entire content of which is incorporated herein by reference.

TECHNICAL FIELD

The present disclosure generally relates to the field of electronic devices and, more particularly, to a camera and a gimbal.

BACKGROUND

In existing cameras, a lock mechanism is provided to lock a shake compensation device when the shake compensation device is in a non-working state. Existing lock mechanisms mostly use a brushless direct current motor (BLDC), a voice coil motor (VCM), or a stepping Motor (STM) to drive a lock shaft for locking.

SUMMARY

In accordance with the disclosure, there is provided a camera including a sensor assembly and a lock mechanism. The sensor assembly includes a movable member and an image sensor coupled to the movable member and configured to move together with the movable member. The lock mechanism is configured to lock the movable member to limit movement of the movable member. The lock mechanism includes a coil assembly and a magnetic attraction assembly. The coil assembly or the magnetic attraction assembly is configured to move closer to or away from the movable member under an action of a magnetic field force in response to the coil assembly being energized, to lock or unlock the movable member.

Also in accordance with the disclosure, there is provided a gimbal including a rotatable joint that includes a motor, a shaft arm installed at the motor and configured to be driven by the motor to rotate, and a lock mechanism provided at the motor or the shaft arm and configured to lock the motor and the shaft arm to limit movement of the shaft arm. The lock mechanism includes a coil assembly and a magnetic attraction assembly. The coil assembly or the magnetic attraction assembly is configured to move closer to or away from the shaft arm under an action of a magnetic field force in response to the coil assembly being energized, to lock or unlock the shaft arm and the motor.

BRIEF DESCRIPTION OF THE DRAWINGS

To more clearly illustrate the technical solutions of the embodiments of the present disclosure, the drawings needed to be used in the description of the embodiments will be briefly introduced below. Obviously, the drawings in the following description are only some embodiments of the present disclosure. Those of ordinary skill in the art may obtain other drawings based on these drawings without exerting creative work.

DETAILED DESCRIPTION OF THE EMBODIMENTS

Technical solutions in the embodiments of the present disclosure are hereinafter described with reference to the accompanying drawings. The described embodiments are merely some, but not all, of the embodiments of the present disclosure. Based on the embodiments in the present disclosure, all other embodiments obtained by those of ordinary skill in the art without making creative efforts fall within the scope of protection of the present disclosure.

It should be understood that the terminology used in this specification is for the purpose of describing particular embodiments only and is not intended to be limiting. As used in this specification, the singular form words "a," "an," and "the" are intended to include the plural forms as well, unless the context clearly dictates otherwise.

It should be further understood that the term "and/or" as used in this specification refers to any and all possible combinations of one or more of the associated listed items and includes such combinations.

Existing lock mechanisms mostly use a brushless direct current motor (BLDC), a voice coil motor (VCM), or a stepping Motor (STM) to drive a lock shaft for locking. Such a lock mechanism has problems such as structural complexity, large size, heavy weight, loud use noise, and short service life, and cannot meet the needs of the market.

Figure 1:
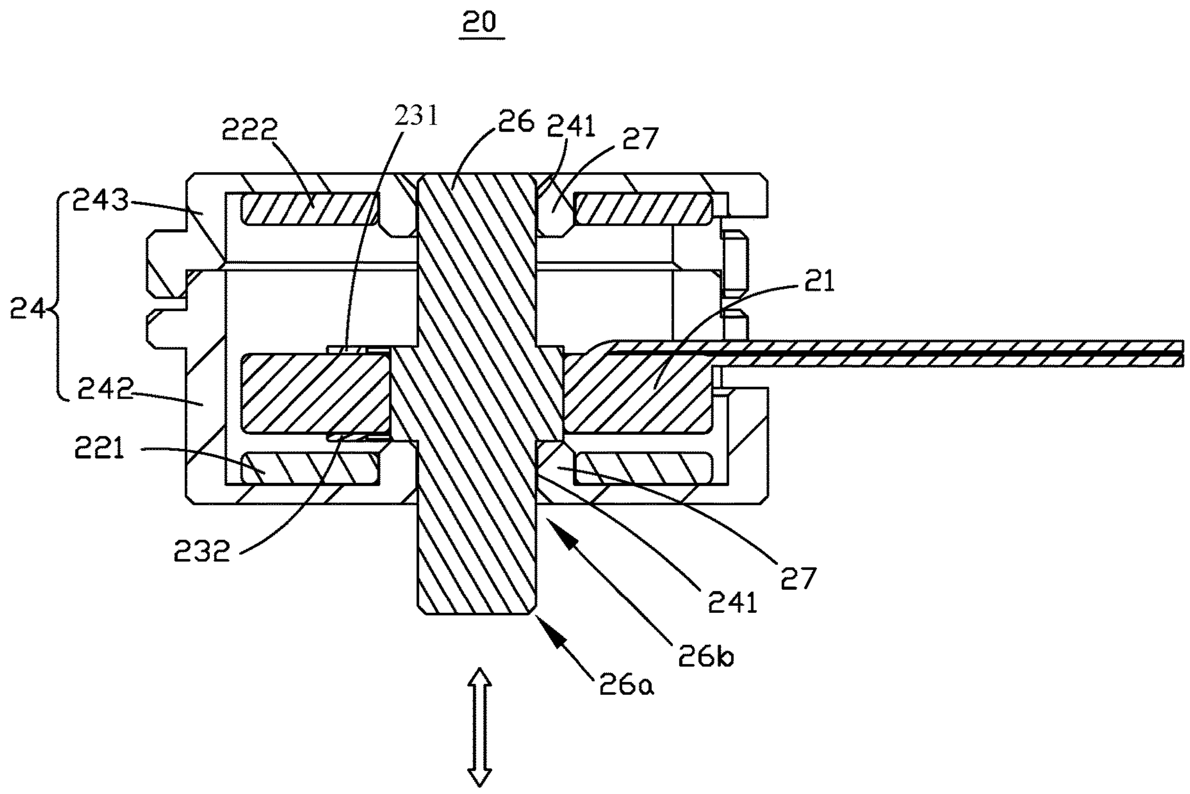
FIG. 1 is a cross-sectional view of a lock mechanism according to an embodiment of the present disclosure.
Figure 2:
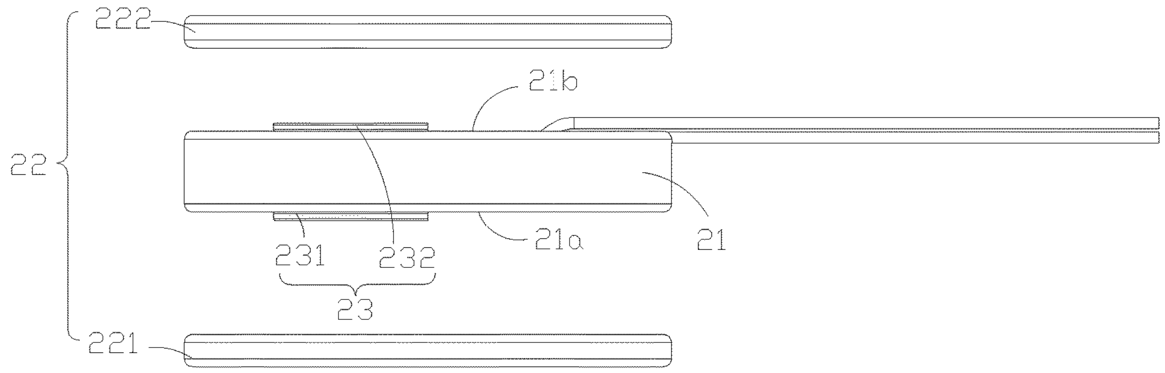
FIG. 2 is a schematic diagram showing cooperation of a coil assembly, a magnetic attraction assembly, and a magnetic yoke assembly of the lock mechanism shown in FIG. 1.
Figure 3:
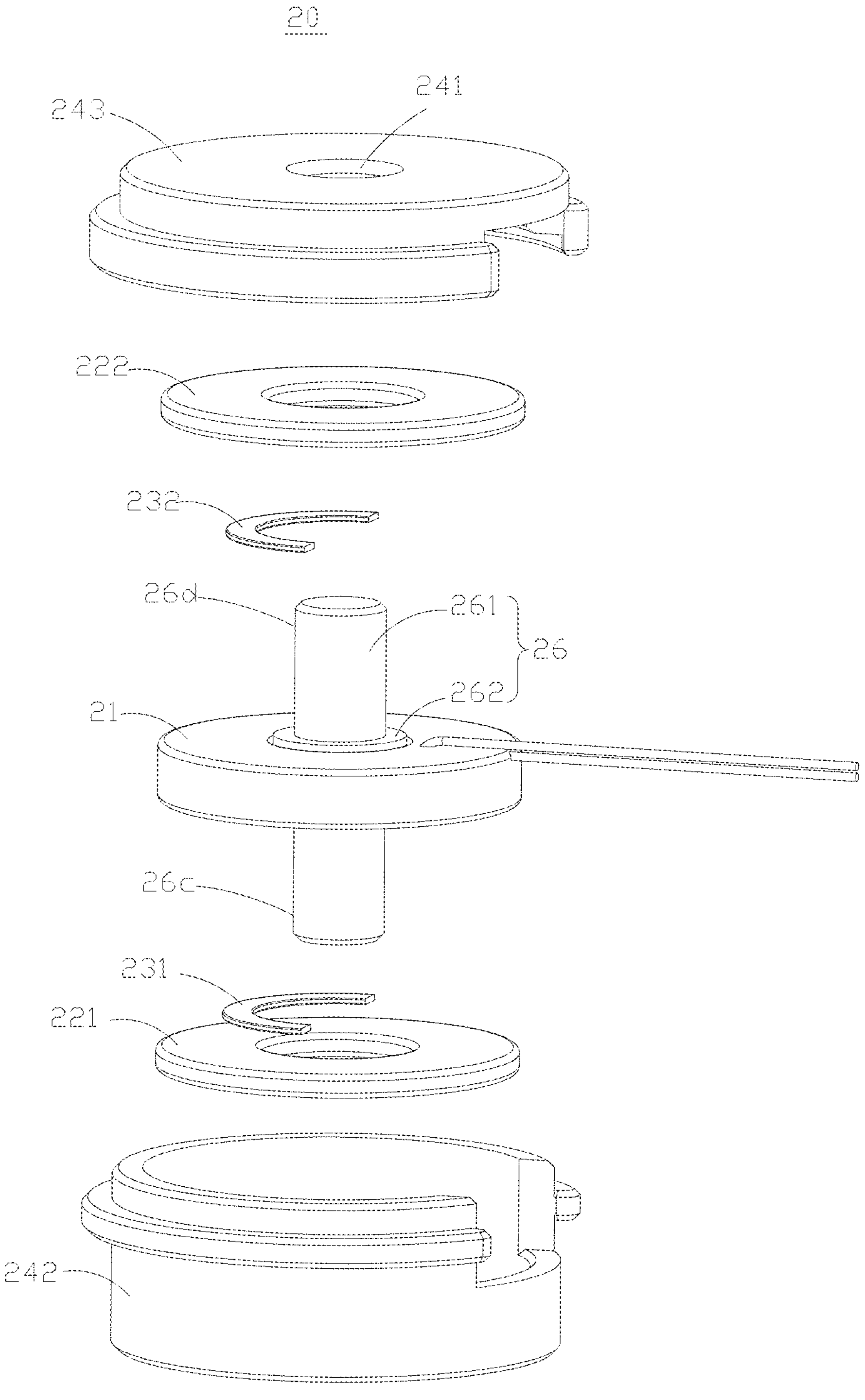
FIG. 3 is an explosive view of a lock mechanism according to an embodiment of the present disclosure.

The present disclosure provides a lock mechanism 20 as shown in FIG. 1 to FIG. 3. The lock mechanism 20 includes a coil assembly 21, a magnetic attraction assembly 22, a magnetic yoke assembly 23, a housing 24, and a lock shaft 26. The housing 24 is provided with a shaft hole 241. The lock shaft 26 is movably installed at the housing 24 and is able to extend out of the housing 24 through the shaft hole 241. One of the coil assembly 21 and the magnetic attraction assembly 22 is installed at the lock shaft 26. The other one of the coil assembly 21 and the magnetic attraction assembly 22 is installed at the housing 24. The magnetic attraction assembly 22 may include a permanent magnet. Of course, the magnetic attraction assembly 22 is not limited to a permanent magnet. For example, in some other embodiments, the magnetic attraction assembly 22 may be a metal magnetic member. The metal magnetic member means that the metal member that is able to be attracted by a magnet, such as, for example, metal members made of iron, cobalt, nickel, or their alloys.

In one embodiment, the lock mechanism 20 may be used to lock a first member and a second member. The first member and the second member may be movably connected. For example, the lock mechanism 20 may be installed at the first member. When in use, the lock mechanism 20 may be installed at the first member. The first member and the second member may be provided with lock holes. When the coil assembly 21 is energized, a magnetic field may be generated, and the coil assembly 21 and the magnetic attraction assembly 22 may be attracted to each other to drive the lock shaft 26 to move. The movable lock shaft 26 may include a lock position **26*a* and an unlock position 26*b*. At the lock position 26*a*, the lock shaft 26 may pass through the lock holes to lock the first member and the second member. At the unlock position 26*b*, the lock shaft 26** may retract from the lock holes to unlock the first member and second members.

The lock mechanism 20 provided by the present disclosure may have a relatively simple structure simple control and high operational reliability. There may be no need to design a transmission mechanism for rotation. The mechanical noise during operation may be low. Further, the lock mechanism 20 may have a small size, occupying a small space.

In some embodiments, the magnetic attraction assembly 22 may include a permanent magnet, and a positioning assembly may include the magnetic yoke assembly 23. The magnetic yoke assembly 23 may be installed at the coil assembly 21. The magnetic yoke assembly 23 may be used to attract the permanent magnet, such that the movable member 12 is able to remain in a locked state or an unlocked state when the coil assembly 21 is powered off or the power is insufficient. The magnetic yoke itself may not produce a magnetic field, but may be a soft magnetic material member that only transmits magnetic force lines in the magnetic circuit. For example, the soft magnetic material member may be made of soft iron, A3 steel, soft magnetic alloy, or ferrite materials.

As shown in FIG. 1 to FIG. 3, in one embodiment, the coil assembly 21 is installed at the lock shaft 26. The coil assembly 21 includes a first side **21*a* and a second side 21*b* opposite to the first side 21*a* in the axial direction of the lock shaft 26. The magnetic attraction assembly 22 includes a first magnet 221 and a second magnet 222. The first magnet 221 is installed at the housing 24 and is located at the first side 21*a* of the coil assembly 21, and the second magnet 222 is installed at the housing 24 and is located at the second side 21*b* of the coil assembly 21. When the current in the first direction passes through the coil assembly 21, the coil assembly 21 attracts the first magnet 221, and the lock shaft 26 moves to the lock position 26*a*. When the current in the second direction passes through the coil assembly 21, the coil assembly 21 attracts the second magnet 222 and the lock shaft 26 reaches the unlock position 26*b*. The first direction and the second direction are opposite directions. Optionally, in this embodiment, the magnetic yoke assembly 23 includes a first magnetic yoke 231 and a second magnetic yoke 232. The first magnetic yoke 231 is installed at the first side of the coil assembly 21, and the first magnetic yoke 231 is used to attract the first magnets 221 such that the lock shaft 26 is able to be maintained in the lock position 26*a* after the current in the first direction of the coil assembly 21 is cut off or when the power is insufficient. The second magnetic yoke 232 is installed at the second side of the coil assembly 21. The second magnetic yoke 232 is used to attract the second magnet 222, such that the lock shaft 26 is able to remain in the unlock position 26*b* after the current in the second direction of the coil assembly 21** is cut off or when the power is insufficient.

Figure 4:
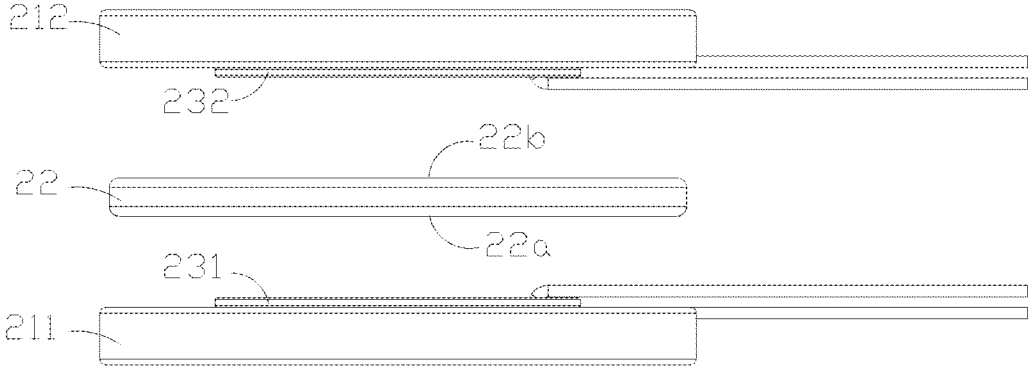
FIG. 4 is a schematic diagram showing cooperation of a coil assembly, a magnetic attraction assembly, and a magnetic yoke assembly according to another embodiment of the present disclosure.
Figure 5:
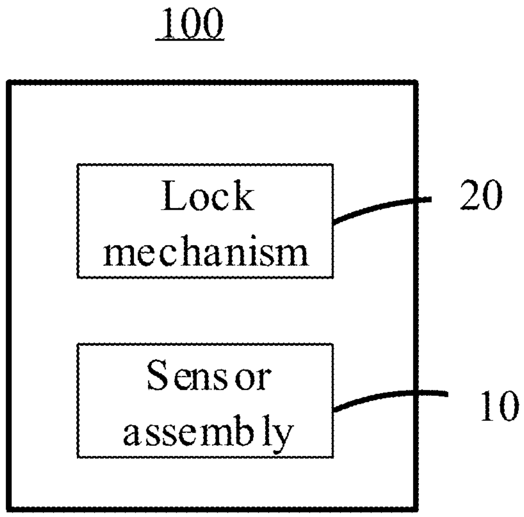
FIG. 5 is a block diagram of a camera according to an embodiment of the present disclosure.
Figure 6:
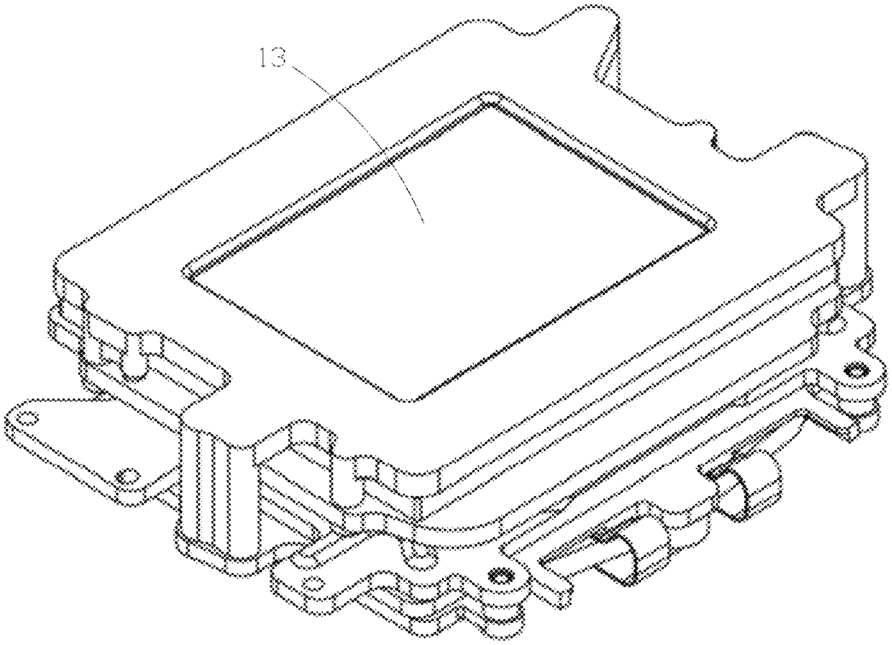
FIG. 6 is a schematic structural diagram of a sensor assembly according to an embodiment of the present disclosure.
Figure 7:
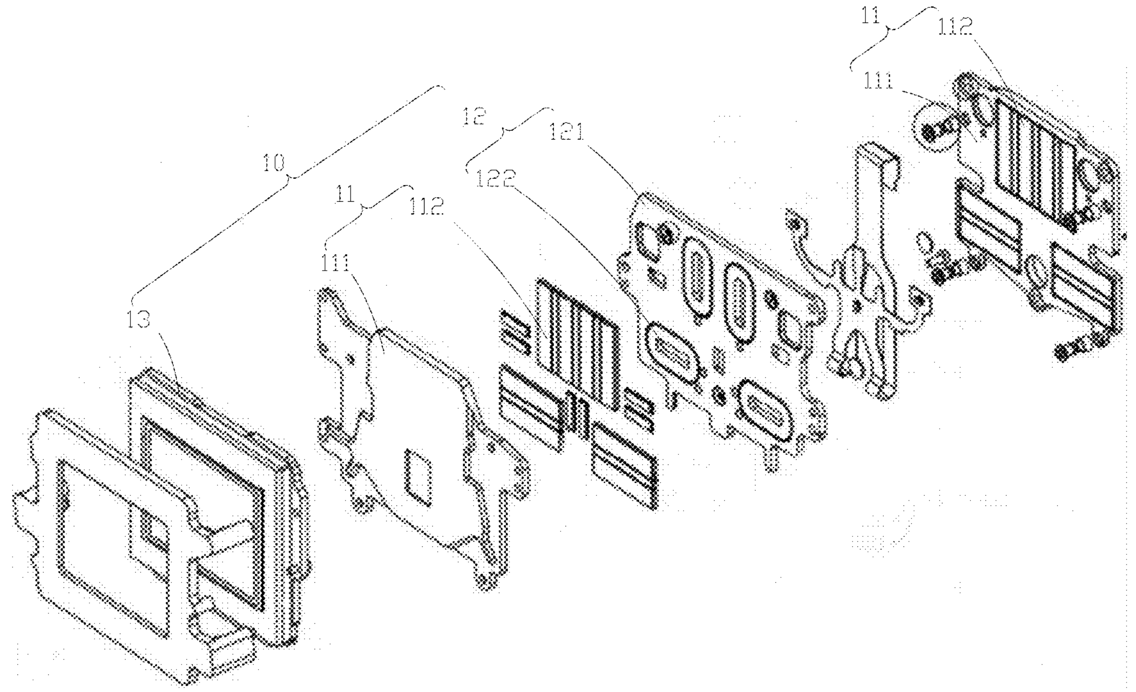
FIG. 7 is an explosive view of a sensor assembly according to an embodiment of the present disclosure.
Figure 8:
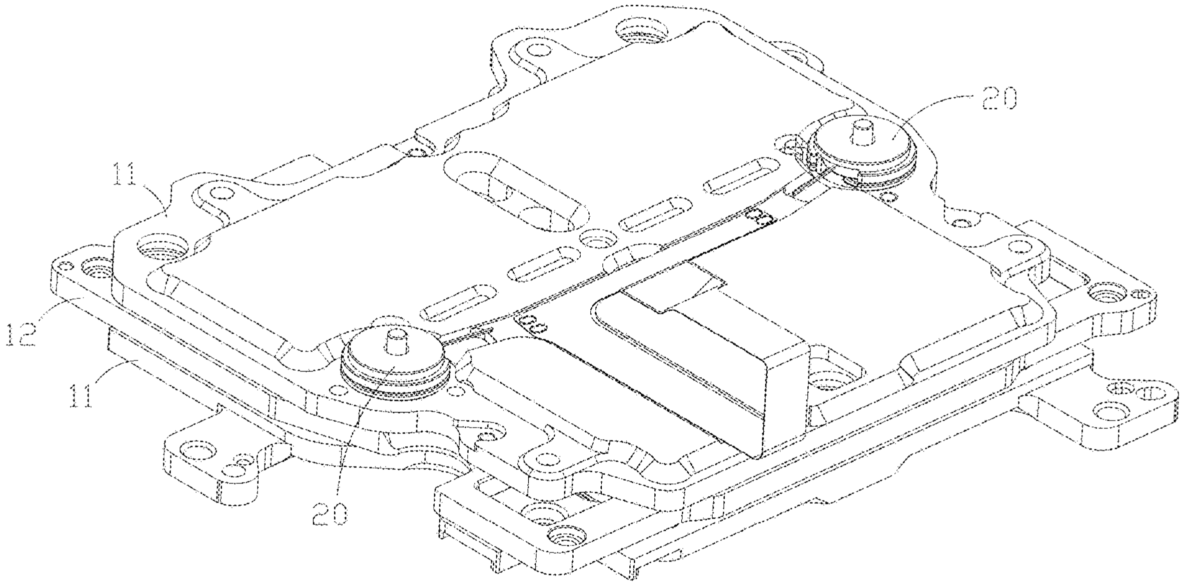
FIG. 8 is an assembling diagram of a fixed member, a movable member, and a lock mechanism according to an embodiment of the present disclosure.

As shown in FIG. 4, in another embodiment, the magnetic attraction assembly 22 is installed at the lock shaft 26. The magnetic attraction assembly 22 includes a first side **22*a* and a second side 22*b* opposite to the first side 22*a* in the axial direction of the lock shaft 26. The coil assembly 21 includes a first coil 211 and a second coil 212. The first coil 211 is installed at the housing 24 and located at the first side 22*a* of the magnetic attraction assembly 22. The second coil 212 is installed at the housing 24 and located at the second side 22*b* of the magnetic attraction assembly 22. When the first coil 211 is energized, the magnetic attraction assembly 22 attracts the first coil 211, and the lock shaft 26 moves to the lock position 26*a*. When the second coil 212 is energized, the magnetic attraction assembly 22 attracts the second coil 212, and the lock shaft 26 moves to the unlock position 26*b*. Optionally, in this embodiment, the magnetic yoke assembly 23 includes a first magnetic yoke 231 and a second magnetic yoke 232. The first magnetic yoke 231 is installed at a side of the first coil 211 facing the magnetic attraction assembly 22. The first magnetic yoke 231 is used to attract the magnetic attraction assembly 22 such that the lock shaft 26 is able to remain in the lock position 26*a* after the first coil 211 is powered off or when the power is insufficient. The second magnetic yoke 232 is installed at a side of the second coil 212 facing the magnetic attraction assembly. The second magnetic yoke 232 is used to attract the magnetic attraction assembly 22, such that the lock shaft 26 is able to remain in the unlock position 26*b* after the second coil 212** is powered off or when the power is insufficient.

As shown in FIG. 1 and FIG. 3, in some embodiments, the lock mechanism 20 further includes a surrounding wall 27. The surrounding wall 27 is located inside the housing 24 and surrounds the edge of the shaft holes 241. The magnetic attraction assembly 22 or the coil assembly 21 may surround the surrounding wall 27. The surrounding wall 27 is used for limiting the stroke of the lock shaft 26 such that the magnetic yoke assembly 23 does not touch the magnetic attraction assembly 22 when the lock shaft 26 moves to the lock position **26*a* or the unlock position 26*b*. In this embodiment, the surrounding wall 27 may provide an installation position for the magnetic attraction assembly 22 or the coil assembly 21. Further, by setting the surrounding wall 27 to prevent the magnetic yoke assembly 23 from touching the magnetic attraction assembly 22, the magnetic yoke assembly 23 may be prevented from being in contact with the magnetic attraction assembly 22, to avoid noise generated when the magnetic yoke assembly 23 collides with the magnetic attraction assembly 22**.

As shown in FIG. 1 and FIG. 3, in some embodiments, the lock shaft 26 includes a shaft body 261 and a protrusion 262. The protrusion 262 is provided at the side wall of the shaft body 261. The coil assembly 21 or the magnetic attraction assembly 22 may be disposed in a ring shape around the protrusion 262. When the lock shaft 26 moves to the lock position 26*a* or the unlock position 26*b*, the protrusion 262 abuts the surrounding wall 27. In this embodiment, when the lock shaft 26 moves to the lock position 26*a* or the unlock position 26*b*, the protrusion 262 may collide with the surrounding wall 27, and the coil assembly 21 or the magnetic attraction assembly 22 may receive less impact, to maintain the reliability of the connection for a long time. Of course, in some other embodiments, the lock shaft 26 may not be provided the protrusion 262, and the coil assembly 21 or the magnetic attraction assembly 22 may be directly disposed on the shaft body 261. In some embodiments, the shaft body 261 and the protrusion 262 may be integrally formed.

In some embodiments, the current passing through the coil assembly 21 may be a DC pulse current, and the DC current may be able to achieve a millisecond-level response, making the lock mechanism 20 more responsive and efficient.

As shown in FIG. 1 and FIG. 3, in some embodiments, the lock shaft 26 includes a first end 26*c* and a second end 26*d* opposite to the first end 26*c*. The housing 24 includes a first housing 242 and a second housing 243. The first housing 242 is provided with one of the shaft holes 241. The first end 26*c* of the lock shaft 26 may extend out of the housing 24 through the shaft hole 241 of the first housing 242. The second housing 243 is provided with another one of the shaft holes 241, and the second end 26*d* of the lock shaft 26 may extend out of the housing 24 through the shaft hole 241 of the second housing 243. In this embodiment, in some usage situations, both sides of the lock mechanism 20 may be locked. Further, during assembly, there may be unnecessary to identify the installation direction of the lock mechanism 20, which may reduce the difficulty of assembly. Of course, in some other embodiment, it is also possible that only one of the first housing 242 and the second housing 243 is provided with the shaft hole 241. When only one of the first housing 242 and the second housing 243 is provided with the shaft hole 241, it may be possible that a groove may be provided at one of the first housing 242 and the second housing 243 without shaft hole 241, and one end of the lock shaft 26 may be inserted into the groove. The groove may guide and support the operation of the lock shaft 26, such that the lock shaft 26 runs smoothly.

As shown in FIG. 1 to FIG. 8, the present disclosure also provides a camera 100 which may be applied to an unmanned aerial vehicle or a handheld photographing device. In one embodiment, the camera 100 may be used in a drone, and the drone may include a fuselage and a gimbal mounted at the fuselage. The camera 100 may be mounted at the gimbal and may be able to take photos or record videos. In some other embodiments, the camera 100 may be used in a handheld photographing device, and the handheld photographing device may include a handheld member and a gimbal mounted at the handheld member. The handheld member may be a handle, and the camera 100 may be mounted at the gimbal and may be able to take pictures or record videos.

Optionally, in one embodiment, the camera 100 may include a sensor assembly 10 and a lock mechanism 20. The sensor assembly 10 may include a fixed member 11, a movable member 12, and an image sensor 13. The movable member 12 and the fixed member 11 may be movably connected, and the image sensor 13 may be coupled to the movable member 12 and may be able to move together with the movable member 12. The lock mechanism 20 may be disposed on the movable member 12 and the fixed member 11. The lock mechanism 20 may be used to lock the fixed member 11 and the movable member 12, to limit the movement of the movable member 12, thereby limiting the movement of the image sensor 13.

Optionally, in some embodiments, the image sensor 13 may be a charge-coupled device (CCD) sensor or a complementary metal oxide semiconductor (CMOS) sensor, or may be other sensors corresponding to spectral end other than visible light such as infrared and ultraviolet, or various sensors that send and receive lasers or sonar to form images. The size of the image sensor 13 may be medium format, full frame, APS-C, or other specifications. The camera 100 may further include a lens. Light may pass through lens structure in the lens and may be illuminated on the imaging surface of the image sensor 13. The image sensor 13 may obtain the light and form an image.

In some embodiments, the sensor assembly 10 may further include a circuit board. The circuit board may include circuits and multiple controllers. The circuits and multiple controllers may provide control signals to the image sensor 13 and receive images or videos captured by the image sensor 13. In some embodiments, the fixed member 11 and the movable member 12 may be combined to form a shake compensation device which is used to drive the image sensor 13 to move when the camera 100 shakes to compensate for the shake such that a clear picture may be able to be obtained even when the camera 100 shakes during photographing.

In some embodiments, the image sensor 13 may include an imaging surface and a mounting surface opposite to the imaging surface, and the shake compensation device may be provided at one side of the mounting surface of the image sensor 13. In this embodiment, the size in the side direction of the peripheral of the image sensor 13 of the camera may be reduced. Therefore, the camera 100 may be compact and small in size, making it easy to carry and use.

In some embodiments, the camera 100 may further include a camera housing and a heat dissipation member. The image sensor 13, the shake compensation device, and the heat dissipation member may be all installed at the camera housing. The heat dissipation member may be used for heat dissipation of the camera.

In some embodiments, the camera 100 may further include an inertial measurement unit which is used to obtain attitude data of the camera 100.

Optionally, in some embodiments, the fixed member 11 may include a fixed installation plate 111 and a magnetic member 112. The magnetic member 112 may be installed at the fixed installation plate 111. The movable member 12 may include a movable installation plate 121 and an electromagnet 122. The electromagnet 122 may be installed at the movable installation plate 121. The fixed installation plate 111 may be stacked with the movable mounting plate 121, and the magnetic member 112 may be opposite to the electromagnet 122. The magnetic member 112 may have a magnetic field. After the electromagnet 122 is energized, the electromagnet 122 may be affected by magnetic force in the magnetic field and the movable member 12 may move under the action of the magnetic force. The moving movable member 12 may drive the image sensor 13 to move, thereby compensating for the shake of the camera 100.

In some other embodiments, the sensor assembly may include two fixed members 11. The two fixed members 11 may be respectively provided at opposite sides of the movable member 12. The movable member 12 and the two fixed members 11 may be stacked, and the two fixed members 11 may be fixed and connected. The movable member 12 may be movably installed between the two fixed members 11. Of course, in some other embodiments, the sensor assembly may include any other suitable number of fixed members 11. For example, in some other embodiments, the sensor assembly may include one fixed member 11, and the movable member 12 and the fixed member 11 may be arranged in a stack. It should also be noted that in some other embodiments, according to actual design needs, the housing of the camera 100 or other members in the camera 100 may be used as the fixed member 11, that is, no additional fixed member 11 may be needed.

As shown in FIG. 1 to FIG. 4, and FIG. 9, in some embodiments, the lock mechanism 20 includes a coil assembly 21 and a magnetic attraction assembly 22. When the coil assembly 21 is energized, the coil assembly 21 or the magnetic attraction assembly 22 may move toward a direction close to or away from the movable member 12 under the action of the magnetic field force, such that the fixed member 11 and the movable member 12 are locked or unlocked. The structure and control of the lock mechanism 20 may be relatively simple, the operation reliability may be high, and there may be no need to design a transmission mechanism for rotation. Therefore the mechanical noise may be small during operation. Further, the lock mechanism 20 may be small in size and occupy a small space, which is beneficial to the structural design of the camera 100.

The magnetic attraction assembly 22 may include a permanent magnet. Of course, the magnetic attraction assembly 22 is not limited to a permanent magnet. For example, in some other embodiments, the magnetic attraction assembly 22 may be a metal magnetic member. The metal magnetic member means that the metal member that is able to be attracted by a magnet, such as, for example, metal members made of iron, cobalt, nickel, or their alloys.

In some embodiments, the lock mechanism 20 may further include a positioning assembly. The positioning assembly may be used to make the movable member 12 remain in a locked state or an unlocked state when the coil assembly 21 is powered off or the power is insufficient. Therefore, the coil assembly 21 may not need to be powered all the time to keep the lock mechanism 20 in the locked or unlocked state, which may effectively reduce energy consumption.

In some embodiments, optionally, the magnetic attraction assembly 21 may include a permanent magnet, and the positioning assembly may include a magnetic yoke assembly 23. The magnetic yoke assembly 23 may be installed at the coil assembly 21. The magnetic yoke assembly 23 may be used to attract the permanent magnet, such that the movable member 12 is able to remain in a locked state or an unlocked state when the coil assembly 21 is powered off or the power is insufficient. The magnetic yoke itself may not produce a magnetic field, but may be a soft magnetic material member that only transmits magnetic force lines in the magnetic circuit. For example, the soft magnetic material member may be made of soft iron, A3 steel, soft magnetic alloy, or ferrite materials.

It should be noted that the positioning member is not limited to using magnetic attraction to maintain the movable member 12 in the locked or unlocked state. For example, in some other embodiments, the positioning member may use mechanical snapping to maintain the movable member 12 in the locked or unlocked state.

In some embodiments, one of the fixed member 11 and the movable member 12 may be provided with lock holes 25. The lock mechanism 20 may further include a housing 24, and a lock shaft 26. The housing 24 may be installed at the fixed member 11, and may be provided with a shaft hole 241. The lock shaft 26 may be movably installed at the housing 24 and may be able to extend out of the housing 24 through the shaft hole 241. One of the coil assembly 21 and the magnetic attraction assembly 22 may be installed at the lock shaft 26. The other one of the coil assembly 21 and the magnetic attraction assembly 22 may be installed at the housing 24. The lock shaft 26 may include a lock position **26*a* and an unlock position 26*b*. At the lock position 26*a*, the lock shaft 26 may pass through the lock holes to lock the first member and the second member. At the unlock position 26*b*, the lock shaft 26** may retract from the lock holes to unlock the first member and second members.

The lock mechanism 20 may be disposed on the fixed member 11 or the movable member 12. When the lock mechanism 20 is disposed on the movable member 12, the housing 24 may be installed at the movable member 12. Correspondingly, the lock hole 25 may be disposed on the fixed member 11.

It should be noted that the lock mechanism 20 may not be provided with a separate housing 24. For example, in some other embodiments, an inner cavity may be provided at the fixed member 11 or the movable member 12, and the coil assembly 21 and the magnetic attraction assembly 22 may be installed within the inner cavity.

It should also be noted that in some other embodiments, the lock mechanism 20 may not be provided with the housing 24 and the lock shaft 26. One of the magnetic attraction assembly 22 and the coil assembly 21 may be installed at the fixing member 11, and another one of the magnetic attraction assembly 22 and the coil assembly 21 may be installed at the movable member 12. When the current in the first direction passes through the coil assembly 21, the magnetic attraction assembly 22 and the coil assembly 21 may attract each other, and the fixed member 11 and the movable member 12 may be locked. When the current in the second direction is supplied to the coil assembly 21, the magnetic attraction assembly 22 and the coil assembly 21 may repel each other, and the fixed member 11 and the movable member 12 may be unlocked.

Figure 9:
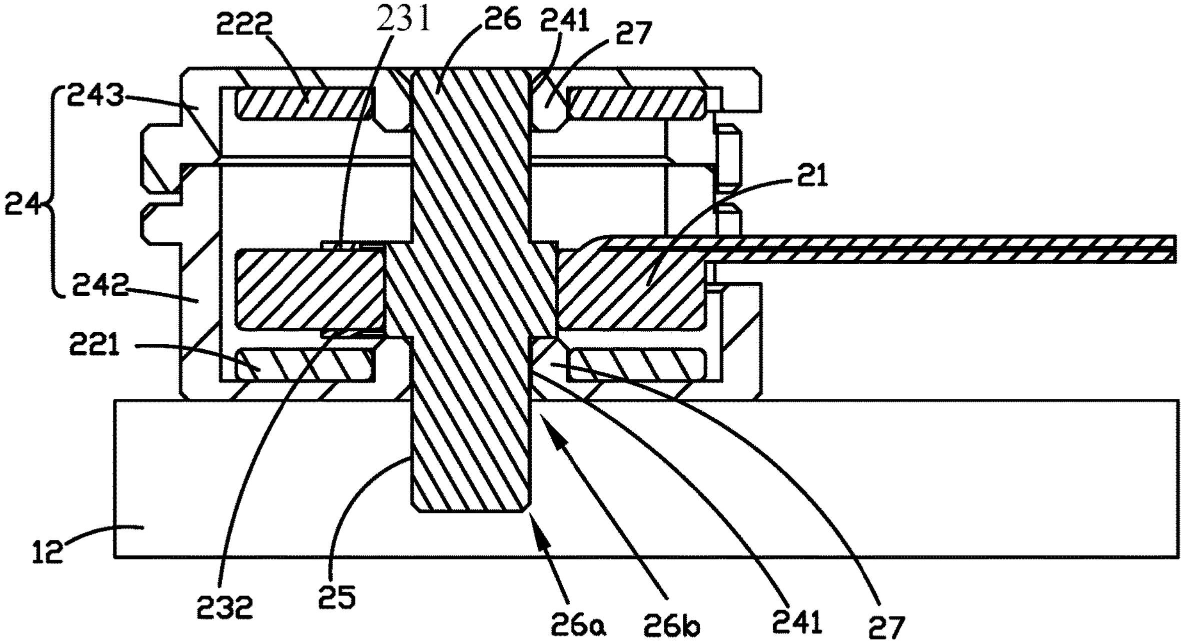
FIG. 9 is a schematic structural diagram showing cooperation of a lock mechanism and a movable member according to an embodiment of the present disclosure.

As shown in FIG. 2, FIG. 3, and FIG. 9, in one embodiment, the coil assembly 21 is installed at the lock shaft 26. The coil assembly 21 includes a first side **21*a* and a second side 21*b* opposite to the first side 21*a* in the axial direction of the lock shaft 26. The magnetic attraction assembly 22 includes a first magnet 221 and a second magnet 222. The first magnet 221 is installed at the housing 24 and is located at the first side 21*a* of the coil assembly 21, and the second magnet 222 is installed at the housing 24 and is located at the second side 21*b* of the coil assembly 21. When the current in the first direction passes through the coil assembly 21, the coil assembly 21 attracts the first magnet 221, and the lock shaft 26 moves to the lock position 26*a*. When the current in the second direction passes through the coil assembly 21, the coil assembly 21 attracts the second magnet 222 and the lock shaft 26 reaches the unlock position 26*b*. The first direction and the second direction are opposite directions. Optionally, in this embodiment, the magnetic yoke assembly 23 includes a first magnetic yoke 231 and a second magnetic yoke 232. The first magnetic yoke 231 is installed at the first side of the coil assembly 21, and the first magnetic yoke 231 is used to attract the first magnets 221 such that the lock shaft 26 is able to be maintained in the lock position 26*a* after the current in the first direction of the coil assembly 21 is cut off or when the power is insufficient. The second magnetic yoke 232 is installed at the second side of the coil assembly 21. The second magnetic yoke 232 is used to attract the second magnet 222, such that the lock shaft 26 is able to remain in the unlock position 26***b* after the current in the second direction of the coil assembly 21 is cut off or when the power is insufficient.

It should be noted that the magnetic attraction assembly 22 is not limited to the above manners. In some other embodiments, the magnetic attraction assembly 22 may only include the first magnet 221 or only include the second magnet 222. For example, the magnetic attraction assembly 22 may only include the first magnet 221, by supplying the current in the first direction or the second direction to the coil assembly 21, the attraction or the repel with the first magnet may be realized, to drive the lock shaft 26 move between the lock position 26*a* and the unlock position 26*b*.

As shown in FIG. 4, in another embodiment, the magnetic attraction assembly 22 is installed at the lock shaft 26. The magnetic attraction assembly 22 includes a first side 22*a* and a second side 22*b* opposite to the first side 22*a* in the axial direction of the lock shaft 26. The coil assembly 21 includes a first coil 211 and a second coil 212. The first coil 211 is installed at the housing 24 and located at the first side 22*a* of the magnetic attraction assembly 22. The second coil 212 is installed at the housing 24 and located at the second side 22*b* of the magnetic attraction assembly 22. When the first coil 211 is energized, the magnetic attraction assembly 22 attracts the first coil 211, and the lock shaft 26 moves to the lock position 26*a*. When the second coil 212 is energized, the magnetic attraction assembly 22 attracts the second coil 212, and the lock shaft 26 moves to the unlock position 26*b*. Optionally, in this embodiment, the magnetic yoke assembly 23 includes a first magnetic yoke 231 and a second magnetic yoke 232. The first magnetic yoke 231 is installed at a side of the first coil 211 facing the magnetic attraction assembly 22. The first magnetic yoke 231 is used to attract the magnetic attraction assembly 22 such that the lock shaft 26 is able to remain in the lock position 26*a* after the first coil 211 is powered off or when the power is insufficient. The second magnetic yoke 232 is installed at a side of the second coil 212 facing the magnetic attraction assembly. The second magnetic yoke 232 is used to attract the magnetic attraction assembly 22, such that the lock shaft 26 is able to remain in the unlock position 26*b* after the second coil 212 is powered off or when the power is insufficient.

It should be noted that the magnetic attraction assembly 22 is not limited to the above manners. In some other embodiments, the magnetic attraction assembly 22 may include a permanent magnet, and the coil assembly 21 may only include the first coil 211 or only include the second coil 212. For example, the coil assembly 21 may only include the first coil 211. By supplying the current in the first direction or in the second direction to the first coil, the attraction or the repel with the magnetic attraction assembly 22 may be realized, such that the magnetic attraction assembly 22 drives the lock shaft 26 to move between the lock position 26*a* and the unlock position 26*b*.

As shown in FIG. 1, in some embodiments, the lock mechanism 20 further includes a surrounding wall 27. The surrounding wall 27 is located inside the housing 24 and surrounds the edge of the shaft holes 241. The magnetic attraction assembly 22 or the coil assembly 21 may surround the surrounding wall 27. The surrounding wall 27 is used for limiting the stroke of the lock shaft 26 such that the magnetic yoke assembly 23 does not touch the magnetic attraction assembly 22 when the lock shaft 26 moves to the lock position 26*a* or the unlock position 26*b*. In this embodiment, the surrounding wall 27 may provide an installation position for the magnetic attraction assembly 22 or the coil assembly 21. Further, by setting the surrounding wall 27 to prevent the magnetic yoke assembly 23 from touching the magnetic attraction assembly 22, the magnetic yoke assembly 23 may be prevented from being in contact with the magnetic attraction assembly 22, to avoid noise generated when the magnetic yoke assembly 23 collides with the magnetic attraction assembly 22.

As shown in FIG. 3, in some embodiments, the lock shaft 26 includes a shaft body 261 and a protrusion 262. The protrusion 262 is provided at the side wall of the shaft body 261. The coil assembly 21 or the magnetic attraction assembly 22 may be disposed in a ring shape around the protrusion 262. When the lock shaft 26 moves to the lock position 26*a* or the unlock position 26*b*, the protrusion 262 abuts the surrounding wall 27. In this embodiment, when the lock shaft 26 moves to the lock position 26*a* or the unlock position 26*b*, the protrusion 262 may collide with the surrounding wall 27, and the coil assembly 21 or the magnetic attraction assembly 22 may receive less impact, to maintain the reliability of the connection for a long time. Of course, in some other embodiments, the lock shaft 26 may not be provided the protrusion 262, and the coil assembly 21 or the magnetic attraction assembly 22 may be directly disposed on the shaft body 261. In some embodiments, the shaft body 261 and the protrusion 262 may be integrally formed.

In some embodiments, the current passing through the coil assembly 21 may be a DC pulse current, and the DC current may be able to achieve a millisecond-level response, making the lock mechanism 20 responsive and efficient.

As shown in FIG. 1 and FIG. 3, in some embodiments, the lock shaft 26 includes a first end 26*c* and a second end 26*d* opposite to the first end 26*c*. The housing 24 includes a first housing 242 and a second housing 243. The first housing 242 is provided with one of the shaft holes 241. The first end 26*c* of the lock shaft 26 may extend out of the housing 24 through the shaft hole 241 of the first housing 242. The second housing 243 is provided with another one of the shaft holes 241, and the second end 26*d* of the lock shaft 26 may extend out of the housing 24 through the shaft hole 241 of the second housing 243. In this embodiment, in some usage situations, both sides of the lock mechanism 20 may be locked. Further, during assembly, there may be unnecessary to identify the installation direction of the lock mechanism 20, which may reduce the difficulty of assembly. Of course, in some other embodiment, it is also possible that only one of the first housing 242 and the second housing 243 is provided with the shaft hole 241. When only one of the first housing 242 and the second housing 243 is provided with the shaft hole 241, it may be possible that a groove may be provided at one of the first housing 242 and the second housing 243 without shaft hole 241, and one end of the lock shaft 26 may be inserted into the groove. The groove may guide and support the operation of the lock shaft 26, such that the lock shaft 26 runs smoothly.

Figure 10:
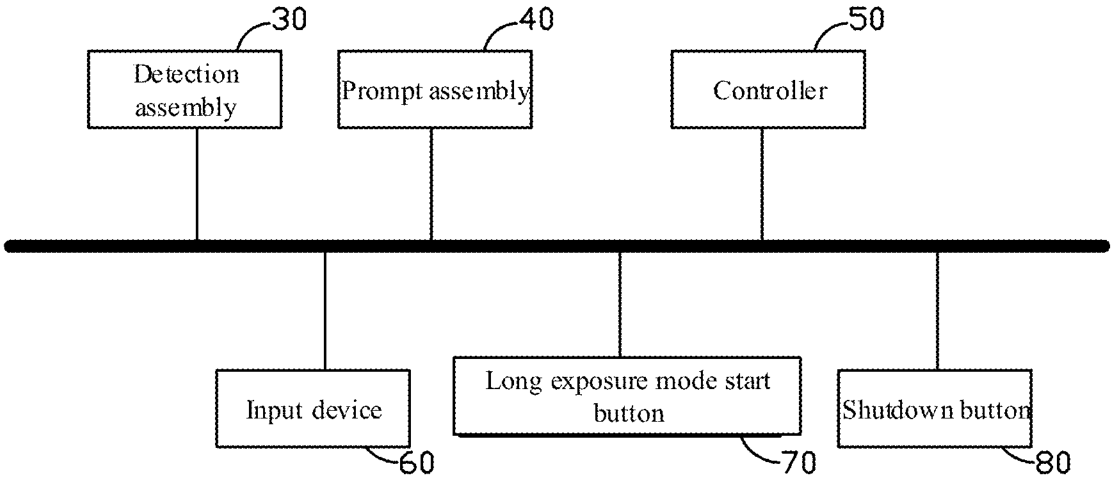
FIG. 10 is a schematic diagram showing connection of a controller, a detection assembly, a prompt assembly, an input device, a power-off button, and a start button for long exposure mode, according to an embodiment of the present disclosure.
Figure 11:
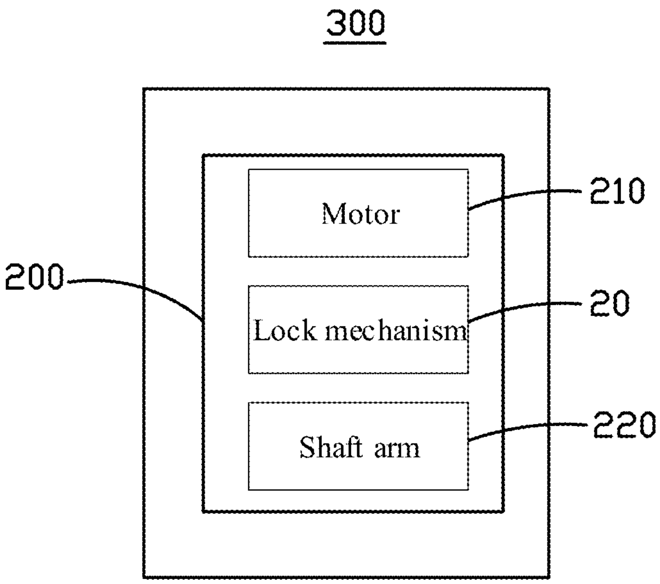
FIG. 11 is a block diagram of a gimbal according to an embodiment of the present disclosure.
Figure 12:
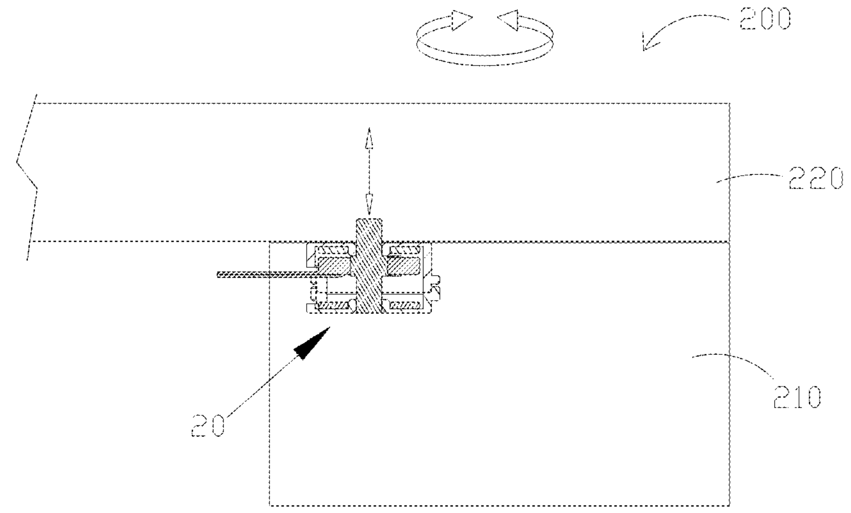
FIG. 12 is a schematic structural diagram of a rotational joint of a gimbal according to an embodiment of the present disclosure.

As shown in FIG. 10, in some embodiments, the camera 100 may further include a detection assembly 30, a prompt assembly 40, and a controller 50. The detection assembly 30 may be installed at the lock mechanism 20 or the fixed member 11 or the movable member 12. The detection assembly 30 may be used to detect whether, in the locked state, the lock shaft 26 is at the lock position 26*a*. The controller 50 may be electrically connected to the detection assembly 30 and the prompt assembly 40. The controller 50 may be used to generate a first prompt message to the prompt assembly 40 to prompt the user when the detection assembly 30 detects that the lock shaft 26 is at the lock position 26*a* in the locked state. The controller 50 may be also configured to generate a second prompt message to the prompt member 40 to prompt the user when the detection member 30 detects that the lock shaft 26 is not at the lock position 26*a* in the locked state. In this embodiment, by setting the prompt assembly 40 to generate the second prompt message to the prompt assembly 40 to prompt the user when the detection assembly 30 detects that the lock shaft 26 is not at the lock position 26*a* in the locked state, the user may conduct troubleshooting in time to avoid the more serious problem in the camera 100.

In various embodiments, for example, the prompt assembly 40 may be a display light installed at the camera 100 to prompt the user by flashing the light, or the prompt assembly 40 may be a pattern or text displayed on the display screen of the camera 100; or the prompt assembly 40 may be a speaker installed at the camera 100 for giving prompts to the user through voice broadcast, or the prompt assembly 40 may give prompts to the user through vibration through a vibration device. The specific implementations may be determined according to actual design needs.

In some embodiments, the controller 50 may be electrically connected to the coil assembly 21, and may be also used to control the coil assembly 21 to power off when the detection assembly 30 detects that the lock shaft 26 is at the lock position 26*a* in the locked state. In this embodiment, energy consumption may be saved.

In some embodiments, for example, the magnetic attraction assembly 22 may be installed at the lock shaft 26, and the detection assembly 30 may include a Hall sensor. The Hall sensor may be installed at the housing 24 and located at a position opposite to the magnetic attraction assembly 22 when the lock shaft 26 is in the lock position 26*a*. Under normal conditions, when the lock shaft 26 moves to the lock position 26*a*, the magnetic attraction assembly 22 may move to a position opposite to the Hall sensor, and the Hall sensor may detect changes in the magnetic field. When the Hall sensor does not detect changes in the magnetic field, the lock shaft 26 may not be in the lock position 26*a*.

In some embodiments, for example, the detection assembly 30 may include a transmitter and a receiver. The transmitter and the receiver may be arranged on opposite sides of the lock hole 25. The transmitter may be used to send out detection signals, and the receiver may be used to receive detection signals sent by the transmitter. Under normal conditions, when the lock shaft 26 moves to the lock position 26*a*, the lock shaft 26 may pass through the lock hole 25. Therefore, the signal sent by the transmitter may be blocked by the lock shaft 26, and the receiver cannot receive the signal. When the receiver receives the signal, it may be indicated that the lock shaft 26 is not in the lock position 26*a*.

In some other embodiments, for example, the detection assembly 30 may include a micro switch which is at least partially located within the lock hole 25. The micro switch may be triggered when the lock shaft 26 extends into the lock hole 25. Under normal conditions, when the lock shaft 26 moves to the lock position 26*a*, the lock shaft 26 may be inserted into the lock hole 25 and trigger the micro switch. When the microswitch is not triggered, it may be indicated that the lock shaft 26 is not in the lock position 26*a*.

In some embodiments, the camera 100 may further include an input device 60. The input device 60 may be configured to respond to a user trigger and generate a locking instruction or an unlocking instruction. The controller 50 may be electrically connected to the input device 60 and the coil assembly 21. The controller 50 may be configured to control the coil assembly 21 to be energized to drive the lock shaft 26 to move to the lock position 26*a* when the locking instruction is received. The controller 50 may be also used to energize the coil assembly 21 to drive the lock shaft 26 to the unlock position 26*b* when receiving the unlocking instruction. Optionally, the input device 60 may include at least one of a button, a knob, a dial, a touch pad, a touch screen, or a voice input device 60.

In some embodiments, the camera may include two lock mechanisms 20. Of course, the number of lock mechanisms 20 included in the camera is not limited to two, and in various embodiments, the camera may include three, four, or more lock mechanisms 20. The number of lock mechanisms 20 may be configured according to actual needs.

In some embodiments, the camera 100 may further include a long exposure mode start button 70 for responding to a user's trigger and starting the long exposure mode. The controller 50 may be electrically connected to the long exposure mode start button 70 and the lock mechanism 20. The controller 50 may be used to control the lock mechanism 20 to lock the movable member 12 when the camera 100 starts the long exposure mode. In this embodiment, by controlling the lock mechanism 20 to lock the movable member 12 in the long exposure mode, the image sensor 13 may be prevented from shaking when the camera 100 is in the long exposure mode resulting in low image quality.

In some embodiments, the camera 100 may further include a shutdown button 80 which is used to respond to a user's trigger and shut down the camera 100. The controller 50 may be electrically connected to the shutdown button 80 and the lock mechanism 20. The controller 50 may be used to control the lock mechanism 20 to lock the movable member 12 when shutting down the camera 100. In this embodiment, when the camera 100 is in the shutdown mode, the movable member 12 may be in the locked state, avoiding the situation that the movable member 12 is still movable and causes a malfunction when the camera 100 is in the shutdown mode.

The present disclosure also provides a gimbal. As shown in FIG. 1 to FIG. 4, FIG. 11, and FIG. 12, in one embodiment, the gimbal 300 includes at least one rotatable joint 200. One rotatable joint 200 includes a motor 210, a shaft arm 220, and a lock mechanism 20. The shaft arm 220 is installed at the motor 210. The motor 210 is used to drive the shaft arm 220 to rotate. The lock mechanism 20 is provided at the motor 210 or the shaft arm 220 and is used to lock the motor 210 and the shaft arm 220 to limit the movement of the shaft arm 220. The lock mechanism 20 includes a coil assembly 21 and a magnetic attraction assembly 22. When the coil assembly 21 is energized, the coil assembly 21 or the magnetic attraction assembly 22 may move toward a direction close to or away from the shaft arm 220 under the action of the magnetic field force, such that the shaft arm 220 and the motor 210 are locked or unlocked. The gimbal 300 may be applied to a handheld photographing device or a drone, to control the attitude of a photographing device on the handheld photographing device or the drone.

In the gimbal 300 provided by the present disclosure, the structure and control of the lock mechanism 20 may be relatively simple, the operation reliability may be high, and there may be no need to design a transmission mechanism for rotation. Therefore the mechanical noise may be small during operation. Further, the lock mechanism 20 may be small in size and occupy a small space, which is beneficial to the structural design of the gimbal 300.

In some embodiments, the gimbal 300 may further include an angle measurement unit which is used to measure the angle rotated by the shaft arm 220 relative to the motor 210.

In some embodiments, the magnetic attraction assembly 22 may include a permanent magnet or a metal magnetic attraction member.

In some embodiments, the lock mechanism 20 may further include a positioning assembly. The positioning assembly may be used to make the shaft arm 220 remain in a locked state or an unlocked state when the coil assembly 21 is powered off or the power is insufficient.

In some embodiments, optionally, the magnetic attraction assembly 21 may include a permanent magnet, and the positioning assembly may include a magnetic yoke assembly 23. The magnetic yoke assembly 23 may be installed at the coil assembly 21. The magnetic yoke assembly 23 may be used to attract the permanent magnet, such that the shaft arm 220 remains in a locked state or an unlocked state when the coil assembly 21 is powered off or the power is insufficient.

In some embodiments, one of the shaft arm 220 and the motor 210 may be provided with lock holes 25. The lock mechanism 20 may further include a housing 24, and a lock shaft 26. The housing 24 may be installed at one of the shaft arm 220 and the motor 210, and may be provided with a shaft hole 241. The lock shaft 26 may be movably installed at the housing 24 and may be able to extend out of the housing 24 through the shaft hole 241. One of the coil assembly 21 and the magnetic attraction assembly 22 may be installed at the lock shaft 26. The other one of the coil assembly 21 and the magnetic attraction assembly 22 may be installed at the housing 24. The lock shaft 26 may include a lock position 26*a* and an unlock position 26*b*. At the lock position 26*a*, the lock shaft 26 may pass through the lock holes to lock the shaft arm 220 or the motor 210. At the unlock position 26*b*, the lock shaft 26 may retract from the lock holes to unlock the shaft arm 220 or the motor 210.

In one embodiment, the coil assembly 21 is installed at the lock shaft 26. The coil assembly 21 includes a first side 21*a* and a second side 21*b* opposite to the first side 21*a* in the axial direction of the lock shaft 26. The magnetic attraction assembly 22 includes a first magnet 221 and a second magnet 222. The first magnet 221 is installed at the housing 24 and is located at the first side 21*a* of the coil assembly 21, and the second magnet 222 is installed at the housing 24 and is located at the second side 21*b* of the coil assembly 21. When the current in the first direction passes through the coil assembly 21, the coil assembly 21 attracts the first magnet 221, and the lock shaft 26 moves to the lock position 26*a*. When the current in the second direction passes through the coil assembly 21, the coil assembly 21 attracts the second magnet 222 and the lock shaft 26 reaches the unlock position 26*b*. The first direction and the second direction are opposite directions. Optionally, in this embodiment, the magnetic yoke assembly 23 includes a first magnetic yoke 231 and a second magnetic yoke 232. The first magnetic yoke 231 is installed at the first side of the coil assembly 21, and the first magnetic yoke 231 is used to attract the first magnets 221 such that the lock shaft 26 is able to be maintained in the lock position 26*a* after the current in the first direction of the coil assembly 21 is cut off or when the power is insufficient. The second magnetic yoke 232 is installed at the second side of the coil assembly 21. The second magnetic yoke 232 is used to attract the second magnet 222, such that the lock shaft 26 is able to remain in the unlock position 26*b* after the current in the second direction of the coil assembly 21 is cut off or when the power is insufficient.

In another embodiment, the magnetic attraction assembly 22 is installed at the lock shaft 26. The magnetic attraction assembly 22 includes a first side 22*a* and a second side 22*b* opposite to the first side 22*a* in the axial direction of the lock shaft 26. The coil assembly 21 includes a first coil 211 and a second coil 212. The first coil 211 is installed at the housing 24 and located at the first side 22*a* of the magnetic attraction assembly 22. The second coil 212 is installed at the housing 24 and located at the second side 22*b* of the magnetic attraction assembly 22. When the first coil 211 is energized, the magnetic attraction assembly 22 attracts the first coil 211, and the lock shaft 26 moves to the lock position 26*a*. When the second coil 212 is energized, the magnetic attraction assembly 22 attracts the second coil 212, and the lock shaft 26 moves to the unlock position 26*b*. Optionally, in this embodiment, the magnetic yoke assembly 23 includes a first magnetic yoke 231 and a second magnetic yoke 232. The first magnetic yoke 231 is installed at a side of the first coil 211 facing the magnetic attraction assembly 22. The first magnetic yoke 231 is used to attract the magnetic attraction assembly 22 such that the lock shaft 26 is able to remain in the lock position 26*a* after the first coil 211 is powered off or when the power is insufficient. The second magnetic yoke 232 is installed at a side of the second coil 212 facing the magnetic attraction assembly. The second magnetic yoke 232 is used to attract the magnetic attraction assembly 22, such that the lock shaft 26 is able to remain in the unlock position 26*b* after the second coil 212 is powered off or when the power is insufficient.

In some embodiments, the lock mechanism 20 further includes a surrounding wall 27. The surrounding wall 27 is located inside the housing 24 and surrounds the edge of the shaft holes 241. The magnetic attraction assembly 22 or the coil assembly 21 may surround the surrounding wall 27. The surrounding wall 27 is used for limiting the stroke of the lock shaft 26 such that the magnetic yoke assembly 23 does not touch the magnetic attraction assembly 22 when the lock shaft 26 moves to the lock position 26*a* or the unlock position 26*b*.

In some embodiments, the lock shaft 26 includes a shaft body 261 and a protrusion 262. The protrusion 262 is provided at the side wall of the shaft body 261. The coil assembly 21 or the magnetic attraction assembly 22 may be disposed in a ring shape around the protrusion 262. When the lock shaft 26 moves to the lock position 26*a* or the unlock position 26*b*, the protrusion 262 abuts the surrounding wall 27.

In some embodiments, the current passing through the coil assembly 21 may be a DC pulse current.

In some embodiments, the lock shaft 26 includes a first end 26*c* and a second end 26*d* opposite to the first end 26*c*. The housing 24 includes a first housing 242 and a second housing 243. The first housing 242 is provided with one of the shaft holes 241. The first end 26*c* of the lock shaft 26 may extend out of the housing 24 through the shaft hole 241 of the first housing 242. The second housing 243 is provided with another one of the shaft holes 241, and the second end 26*d* of the lock shaft 26 may extend out of the housing 24 through the shaft hole 241 of the second housing 243.

In some embodiments, the gimbal 300 may further include a detection assembly 30. The detection assembly 30 may be installed at the lock mechanism 20 or the motor 210 or the shaft arm 220. The detection assembly 30 may be used to detect whether the lock shaft 26 is at the lock position 26*a* in the locked state.

In some embodiments, the gimbal 300 may further include a prompt assembly 40 and a controller 50. The controller 50 may be electrically connected to the detection assembly 30 and the prompt assembly 40. The controller 50 may be used to generate a first prompt message to the prompt assembly 40 to prompt the user when the detection assembly 30 detects that the lock shaft 26 is at the lock position 26*a* in the locked state. The controller 50 may be also configured to generate a second prompt message to the prompt member 40 to prompt the user when the detection member 30 detects that the lock shaft 26 is not at the lock position 26*a* in the locked state.

In some embodiments, the controller 50 may be electrically connected to the coil assembly 21, and may be also used to control the coil assembly 21 to power off when the detection assembly 30 detects that the lock shaft 26 is at the lock position 26*a* in the locked state.

In some embodiments, for example, the magnetic attraction assembly 22 may be installed at the lock shaft 26, and the detection assembly 30 may include a Hall sensor. The Hall sensor may be installed at the housing 24 and located at a position opposite to the magnetic attraction assembly 22 when the lock shaft 26 is in the lock position 26*a*.

In some embodiments, for example, the detection assembly 30 may include a transmitter and a receiver. The transmitter and the receiver may be arranged on opposite sides of the lock hole 25. The transmitter may be used to send out detection signals, and the receiver may be used to receive detection signals sent by the transmitter.

In some other embodiments, for example, the detection assembly 30 may include a micro switch which is at least partially located within the lock hole 25. The micro switch may be triggered when the lock shaft 26 extends into the lock hole 25.

In some embodiments, the gimbal 300 may further include an input device 60. The input device 60 may be configured to respond to a user trigger and generate a locking instruction or an unlocking instruction. The controller 50 may be electrically connected to the input device 60 and the coil assembly 21. The controller 50 may be configured to control the coil assembly 21 to be energized to drive the lock shaft 26 to move to the lock position 26*a* when the locking instruction is received. The controller 50 may be also used to energize the coil assembly 21 to drive the lock shaft 26 to the unlock position 26*b* when receiving the unlocking instruction.

In some embodiments, the input device 60 may include at least one of a button, a knob, a dial, a touch pad, a touch screen, or a voice input device 60.

In some embodiments, the gimbal 300 may further include a shutdown button 80 which is used to respond to a user's trigger and shut down the gimbal 300. The controller 50 may be electrically connected to the shutdown button 80 and the lock mechanism 20. The controller 50 may be used to control the lock mechanism 20 to lock the movable member 12 when shutting down the gimbal 300.

Where the structures and connections of the members of the gimbal 300 are same as the structures and connections of the members of the above-described camera, for benefits, reference may be made to the above embodiments, which will not be repeated here.

The above described are merely specific implementation manners of the present application, but the protection scope of the present application is not limited thereto. Any person skilled in the art can easily conceive of various equivalent modifications or replacements within the technical scope disclosure by the present application. These modifications or replacements shall all be included in the protection scope of the present application. Therefore, the scope of protection of the present application shall be subject to the scope set forth in the claims.

What is claimed is:

1. A camera comprising:

a sensor assembly including a movable member and an image sensor coupled to the movable member and configured to move together with the movable member;

a lock mechanism configured to lock the movable member to limit movement of the movable member, the lock mechanism including a coil assembly and a magnetic attraction assembly, and the coil assembly or the magnetic attraction assembly being configured to move closer to or away from the movable member under an action of a magnetic field force in response to the coil assembly being energized, to lock or unlock the movable member, and the magnetic attraction assembly includes a permanent magnet; and a magnetic yoke assembly installed at the coil assembly and configured to attract the permanent magnet such that the movable member remains in a locked state or an unlocked state in response to the coil assembly being powered off or a power to the coil assembly being insufficient.

2. The camera according to claim 1, wherein:

the sensor assembly further includes a fixed member;

the movable member is movably connected to the fixed member;

the lock mechanism is provided at one of the movable member and the fixed member for locking the movable member and the fixed member; and the fixed member is configured to limit movement of the movable member.

3. The camera according to claim 2, wherein:

one of the fixed member and the movable member is provided with a lock hole;

the lock mechanism further includes:

- a housing installed at another of the fixed member and the movable member and provided with a shaft hole; and
- a lock shaft movably installed at the housing and configured to extend out of the housing through the shaft hole;

one of the coil assembly and the magnetic attraction assembly is installed at the lock shaft, and another of the coil assembly and the magnetic attraction assembly is installed at the housing;

the lock shaft is configured to move between:

- a lock position, at which the lock shaft passes through the lock hole to lock the fixed member and the movable member, and
- an unlock position, at which the lock shaft withdraws from the lock hole to unlock the fixed member and the movable member.

4. The camera according to claim 3, wherein:

the coil assembly is installed at the lock shaft and includes a first side and a second side opposite to the first side in an axial direction of the lock shaft;

the permanent magnet includes:

- a first magnet installed at the housing and located at the first side of the coil assembly; and
- a second magnet installed at the housing and located at the second side of the coil assembly;

in response to a current in a first direction passing through the coil assembly, the coil assembly attracts the first magnet and the lock shaft moves to the lock position; and in response to a current in a second direction opposite to the first direction passing through the coil assembly, the coil assembly attracts the second magnet and the lock shaft moves to the unlock position.

5. The camera according to claim 3, wherein:

the magnetic attraction assembly is installed at the lock shaft;

the magnetic attraction assembly includes a first side and a second side opposite to the first side in an axial direction of the lock shaft;

the coil assembly includes:

a first coil installed at the housing and located at the first side of the magnetic attraction assembly; and a second coil installed at the housing and located at the second side of the magnetic attraction assembly;

in response to the first coil being energized, the magnetic attraction assembly attracts the first coil and the lock shaft moves to the lock position; and in response to the second coil being energized, the magnetic attraction assembly attracts the second coil and the lock shaft moves to the unlock position.

6. The camera according to claim 5, wherein the magnetic yoke assembly includes:

a first magnetic yoke installed at a side of the first coil facing the magnetic attraction assembly, and configured to attract the magnetic attraction assembly such that the lock shaft remains in the lock position after the first coil is powered off or when a power to the first coil is insufficient; and a second magnetic yoke installed at a side of the second coil facing the magnetic attraction assembly, and configured to attract the magnetic attraction assembly such that the lock shaft remains in the unlock position after the second coil is powered off or when a power to the second coil is insufficient.

7. The camera according to claim 6, wherein:

the lock mechanism further includes a surrounding wall located inside the housing and surrounding an edge of the shaft hole;

the coil assembly surrounds the surrounding wall; and the surrounding wall is configured to limit a stroke of the lock shaft, such that the magnetic yoke assembly does not touch the magnetic attraction assembly when the lock shaft moves to the lock position or the unlock position.

8. The camera according to claim 3, wherein:

the lock shaft includes a first end and a second end opposite to the first end;

the shaft hole is one of a first shaft hole and a second shaft hole; and the housing includes:

a first housing provided with the first shaft hole, the first end of the lock shaft being configured to extend out of the housing through the first shaft hole; and a second housing provided with the second shaft hole, the second end of the lock shaft being configured to extend out of the housing through the second shaft hole.

9. The camera according to claim 3, further comprising:

a detection assembly installed at one of the lock mechanism, the fixed member, and the movable member, and configured to detect whether the lock shaft in the locked state is at the lock position.

10. The camera according to claim 9, further comprising:

a prompt assembly; and a controller electrically connected to the detection assembly and the prompt assembly, and configured to:

generate a first prompt message to the prompt assembly in response to the detection assembly detecting that the lock shaft in the locking state is at the lock position; and generate a second prompt message to the prompt assembly in response to the detection assembly detecting that the lock shaft in the locking state is not at the lock position.

11. The camera according to claim 9, further comprising:

a controller electrically connected to the detection assembly and the coil assembly, wherein the controller is used to control the coil assembly to power off when the detection assembly detects that the lock shaft in the locking state is at the lock position.

12. The camera according to claim 9, wherein:

the magnetic attraction assembly is installed at the lock shaft, and the detection assembly includes a Hall sensor installed at the housing and located in a position opposite to the magnetic attraction assembly when the lock shaft is in the lock position;

or the detection assembly includes a micro switch at least partially located in the lock hole and configured to be triggered by the lock shaft in response to the lock shaft extending into the lock hole.

13. The camera according to claim 3, further comprising:

an input device configured to respond to a user's trigger and generate a locking instruction or an unlocking instruction; and a controller electrically connected to the input device and the coil assembly, and configured to:

control the coil assembly to be energized in response to receiving the locking instruction, to drive the lock shaft to move to the lock position; and control the coil assembly to be energized to drive the lock shaft to move to the unlock position in response to receiving the unlocking instruction.

14. The camera according to claim 5, wherein the fixed member and the movable member form a shake compensation device configured to drive the image sensor to move when the camera shakes, to compensate for the shake.

15. The camera according to claim 14, further comprising:

a shutdown button configured to respond to a user's trigger and shut down the camera; and a controller electrically connected to the shutdown button and the lock mechanism, and configured to control the lock mechanism to lock the movable member in response to the camera being shut down.

16. The camera according to claim 1, wherein a current passing through the coil assembly is a DC pulse current.

17. A gimbal comprising:

a rotatable joint including:

a motor;

a shaft arm installed at the motor and configured to be driven by the motor to rotate;

a lock mechanism provided at the motor or the shaft arm and configured to lock the motor and the shaft arm to limit movement of the shaft arm, the lock mechanism including a coil assembly and a magnetic attraction assembly, and the coil assembly or the magnetic attraction assembly being configured to move closer to or away from the shaft arm under an action of a magnetic field force in response to the coil assembly being energized, to lock or unlock the shaft arm and the motor, and the magnetic attraction assembly including a permanent magnet; and a magnetic yoke assembly installed at the coil assembly and configured to attract the permanent magnet such that the movable member remains in a locked state or an unlocked state in response to the coil assembly being powered off or a power to the coil assembly being insufficient.

18. A camera comprising:

a sensor assembly including a fixed member, movable member movably connected to the fixed member, and an image sensor coupled to the movable member and configured to move together with the movable member, the fixed member being configured to limit movement of the movable member, one of the fixed member and the movable member being provided with a lock hole; and a lock mechanism configured to lock the movable member to limit movement of the movable member, being provided at one of the movable member and the fixed member for locking the movable member and the fixed member, and including:

a coil assembly and a magnetic attraction assembly, the coil assembly or the magnetic attraction assembly being configured to move closer to or away from the movable member under an action of a magnetic field force in response to the coil assembly being energized, to lock or unlock the movable member;

a positioning assembly configured to keep the movable member in a locked state or an unlocked state in response to the coil assembly being powered off or a power to the coil assembly being insufficient;

a housing installed at another of the fixed member and the movable member and provided with a shaft hole;

a lock shaft movably installed at the housing and configured to extend out of the housing through the shaft hole; and a magnetic yoke assembly;

wherein:

the lock shaft is configured to move between:

a lock position, at which the lock shaft passes through the lock hole to lock the fixed member and the movable member, and an unlock position, at which the lock shaft withdraws from the lock hole to unlock the fixed member and the movable member;

the magnetic attraction assembly is installed at the lock shaft;

the magnetic attraction assembly includes a first side and a second side opposite to the first side in an axial direction of the lock shaft;

the coil assembly includes:

a first coil installed at the housing and located at the first side of the magnetic attraction assembly; and a second coil installed at the housing and located at the second side of the magnetic attraction assembly;

in response to the first coil being energized, the magnetic attraction assembly attracts the first coil and the lock shaft moves to the lock position;

in response to the second coil being energized, the magnetic attraction assembly attracts the second coil and the lock shaft moves to the unlock position; and the magnetic yoke assembly includes:

a first magnetic yoke installed at a side of the first coil facing the magnetic attraction assembly, and configured to attract the magnetic attraction assembly such that the lock shaft remains in the lock position after the first coil is powered off or when a power to the first coil is insufficient; and a second magnetic yoke installed at a side of the second coil facing the magnetic attraction assembly, and configured to attract the magnetic attraction assembly such that the lock shaft remains in the unlock position after the second coil is powered off or when a power to the second coil is insufficient.

* * * * *